United States Patent [19]
Uesugi et al.

[11] Patent Number: 5,414,737
[45] Date of Patent: May 9, 1995

[54] DATA DECODING DEVICE WITH ERROR RATE ESTIMATION

[75] Inventors: Mitsuru Uesugi; Yoshiko Saito; Kazuhisa Tsubaki; Kouichi Honma, all of Yokohama, Japan

[73] Assignee: Matsushita Electric Industrial Co., Ltd., Osaka, Japan

[21] Appl. No.: 975,695

[22] Filed: Nov. 13, 1992

[30] Foreign Application Priority Data

Nov. 20, 1991 [JP] Japan ................. 3-304414

[51] Int. Cl.6 ............................ H04L 27/06
[52] U.S. Cl. ...................... 375/340; 371/5.1
[58] Field of Search ................. 375/11-16, 375/94, 99; 371/5.1, 5.2

[56] References Cited

U.S. PATENT DOCUMENTS 4,234,954 11/1980 Lange et al. .................. 375/99

FOREIGN PATENT DOCUMENTS 61-135234 6/1986 Japan .

OTHER PUBLICATIONS

Takashi Kamitake et al., "Trellis Coding 14.4 kb/s Data Modem Implemented with a Single-chip High-speed Digital Signal Processor", pp. 479-484, IEEE/IEICE Global Telecommunications Conference, Nov. 15-18, 1987.

Richard W. Koralek et al., "Viterbi Decoder Synchronization And BER Measurement Using Metric Values", pp. 354-363, Proceedings of the Sixteenth Annual Allerton Conference on Communication Control and Computing, Oct. 4-6, 1978.

Mitsuru Uesugi, et al. "Adaptive Equalization in TDMA Digital Mobile Radio", IEEE Global Telecommunications Conference and Exhibition, pp. 0095-0101, Nov. 27-30, 1989.

Primary Examiner—Stephen Chin
Assistant Examiner—Hai H. Phan
Attorney, Agent, or Firm—Stevens, Davis, Miller & Mosher

[57] ABSTRACT

A data decoding device eliminates the need for encoding by a decoder for estimating an error rate and can estimate the error rate at a high precision even if an error is included. A square error sum is calculated by an error calculator based on an output of an equalizer. A estimated error rate is determined based on the error sum, a likelihood is determined based on the estimated error rate, and soft discrimination decoding is made based on the likelihood and the output of the equalizer.

4 Claims, 4 Drawing Sheets

DATA DECODING DEVICE WITH ERROR RATE ESTIMATION

BACKGROUND OF THE INVENTION

The present invention relates to a data decoding device used in a digital mobile communication receiver.

FIG. 1 shows a configuration of a prior art data decoding device. In FIG. 1, numeral 1 denotes a base station, numeral 2 denotes a transmission antenna thereof, numeral 3 denotes a receiving antenna and numeral 4 denotes a demodulator. Numeral 5 denotes a demodulated signal which is an output of the demodulator 4 and which is applied to an equalizer 6. An equalized signal 7 which is an output of the equalizer 6 is applied to a decoder 8 and an error calculator 9. Numeral 10 denotes a square error which is applied to a likelihood calculator 11. A likelihood 12 which is an output of the likelihood calculator 11 is applied to the decoder 8 which produces decoded data 13 and an estimated error rate 14.

FIG. 2 shows a configuration of the error calculator 9. In FIG. 2, an equalization signal 15 is supplied to a discriminator 16. An error 18 between a discrimination signal 17 which is an output of the discriminator 16 and the equalization signal 15 is calculated and a square error 19 which is a square of the error 18 is applied to an adder 20 which produces 1 a square error sum 21.

An operation of the prior art is now explained. In FIG. 1, the base station 1 transmits a signal to a mobile station from the transmission antenna 2. The mobile station receives it by the receiving antenna 3 and demodulates it by the demodulator 4 to produce the demodulated signal 5 to be used by the equalizer 6, which eliminates a distortion of a waveform of the demodulated signal 5 and improves an error rate to produce the equalization signal 7, which is supplied to the error calculator 9 and the demodulator 8. As shown in FIG. 2, the error calculator 9 discriminates a polarity of the equalization signal 15 by the discriminator 16, and if it is positive, it converts the equalization signal 15 to 1, and if it is negative, it converts the equalization signal to −1. Then, a difference between the equalization signal 15 and the identification signal 17 is calculated to produce the error 18. The error 18 is then squared to produce the square error 19 which is applied to the adder 20 to produce the square error sum 21.

When the equalization signal 15 does not include an error, the square error sum 21 is equal to a power of a noise component of the equalization signal 15 and an error rate of the equalization signal 15 may be derived therefrom. However; when an error is included, the square error sum 21 is not equal to the power and an error rate cannot be derived therefrom. FIG. 3 shows the equalization signal 15 and the square error 19, and a probability of occurence thereof when the transmission data is −1 and the discrimination signal 17 is −1 (no error) even if the equalization signal 15 is positive. By calculating in the way, the square error sum 21 is equal to the power of the noise component of the equalization signal 15. In actual use, however, since the discrimination signal 17 is 1 when the equalization signal 15 is positive, the square error 19 appears as shown in FIG. 4 in which it is smaller than a real noise component. The square error 10 which is the output of the error calculator 9 is applied to the likelihood calculator 11 which calculates the likelihood 12. The decoder 8 makes soft discrimination decoding based on the likelihood 12 and the equalization signal 7 to produce the decoded data 13 having a low error rate. The decoder 8 further encodes the decoded data 13 to simulate it to a pattern transmitted by the base station, and compares it with the equalization signal 7 to produce an estimated error rate 14. (The deduced error 14 is required in reporting a quality of a line to the base station). As described above, the prior art data decoding device has the problems that (1) the reencoding by the decoder 8 is required because the error rate cannot be derived from the square error sum 10 since the error sum is smaller than the real noise component when the error is included; (2) the derived error rate includes an error because the encoded signal does not represent to the pattern transmitted from the base station when the error is included; and (3) the error rate of the decoding data is higher than that obtained when the error rate is used because it is considered that more appropriate redundancy may be obtained when the error rate is used in the likelihood calculation than when the square error sum 10 is used since the likelihood 12 should be added in accordance with the error rate.

SUMMARY OF THE INVENTION

It is an object of the present invention to provide a data decoding device which does not need encoding by the decoder, improves a precision of the deduced error rate and produces a more appropriate likelihood than that obtainable by the prior art device.

In order to achieve the above object, in accordance with the present invention, an error rate deducer for estimating the error rate based on the square error sum is provided between the error calculator and the likelihood calculator in order to eliminate the need for the encoding by the decoder.

In accordance with the present invention, since the error rate estimator for estimating the error rate based on the square error sum is provided between the error calculator and the likelihood calculator, the encoding by the decoder is not necessary, the precision 1 of the estimated error rate is improved and the decoding characteristic is improved.

DESCRIPTION OF THE PREFERRED EMBODIMENT

Figure 1:
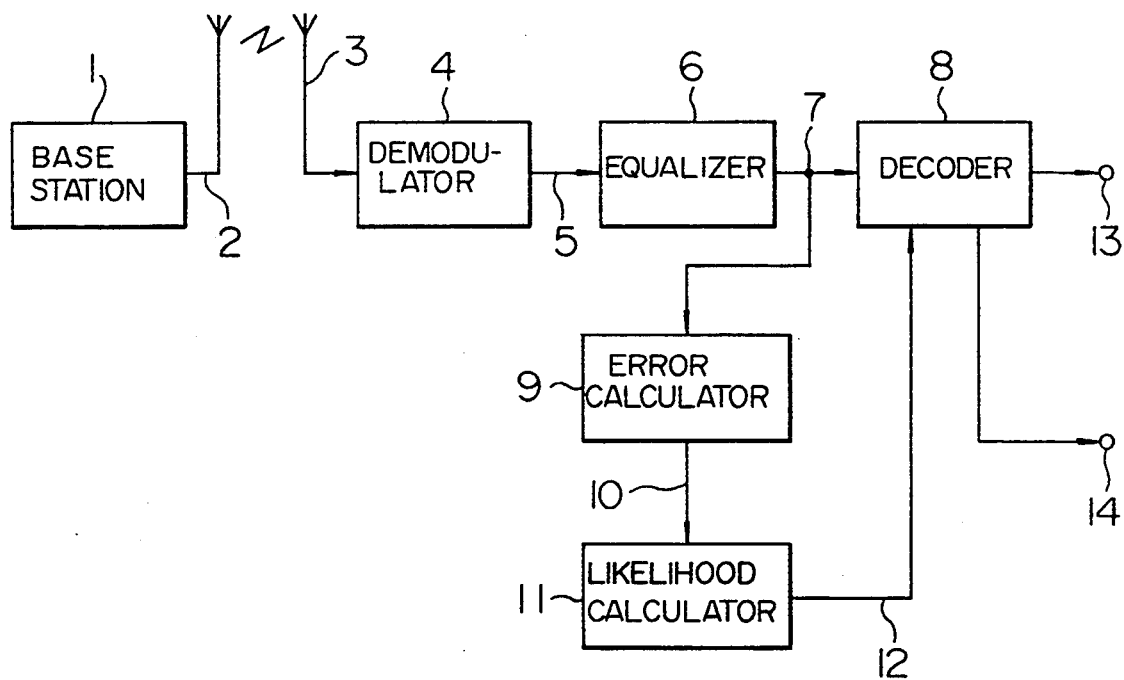
FIG. 1 shows a schematic block diagram of a prior art data decoding device.
Figure 2:
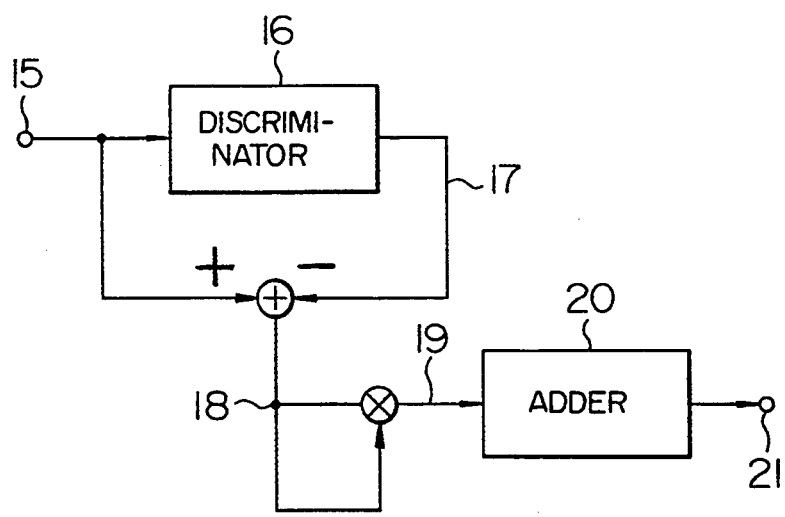
FIG. 2 shows a block diagram of an error calculator which is a portion of the data decoding device.
Figure 3:
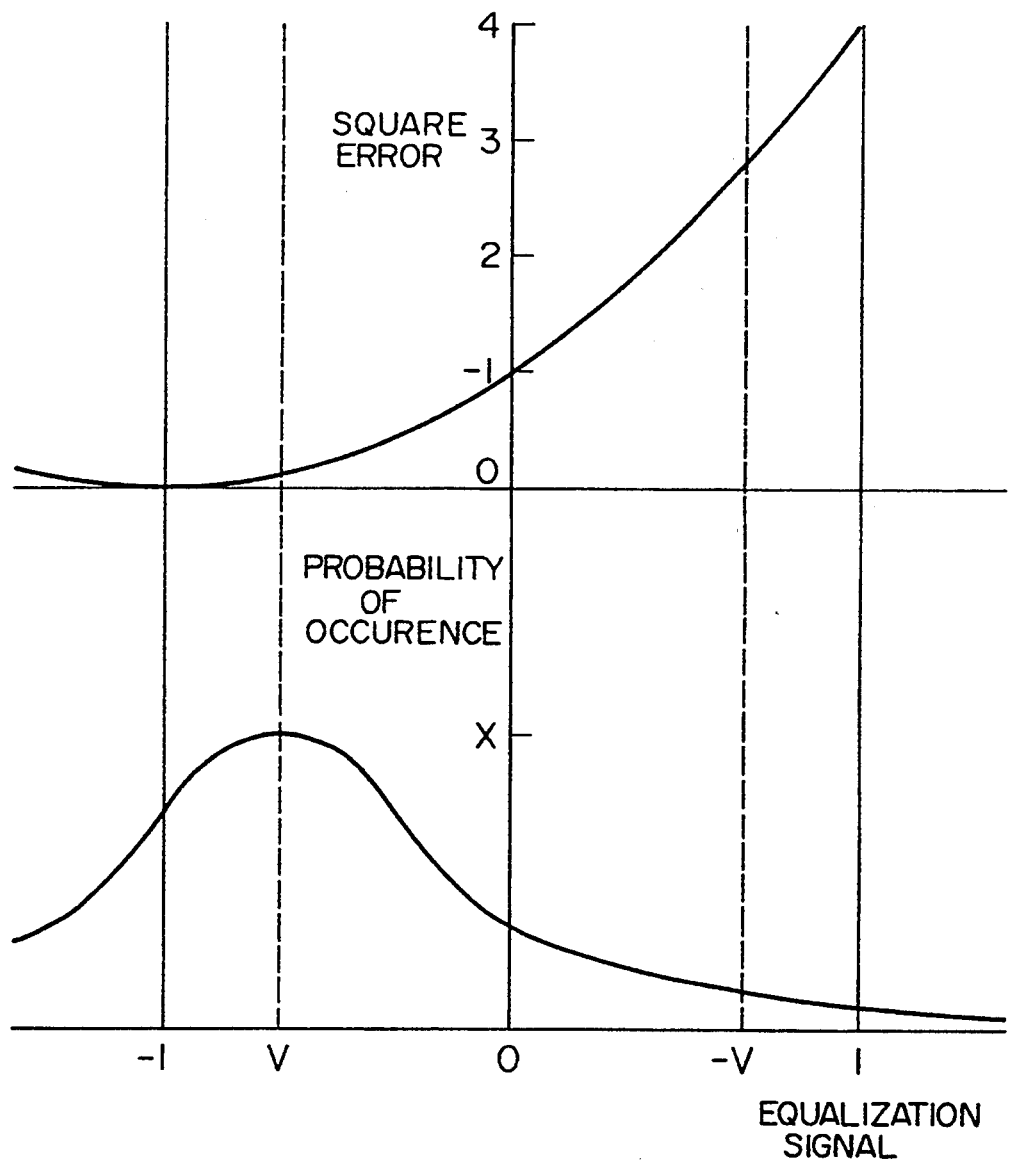
FIG. 3 shows an error characteristic chart derived from the error calculator (when no discrimination error is included)
Figure 4:
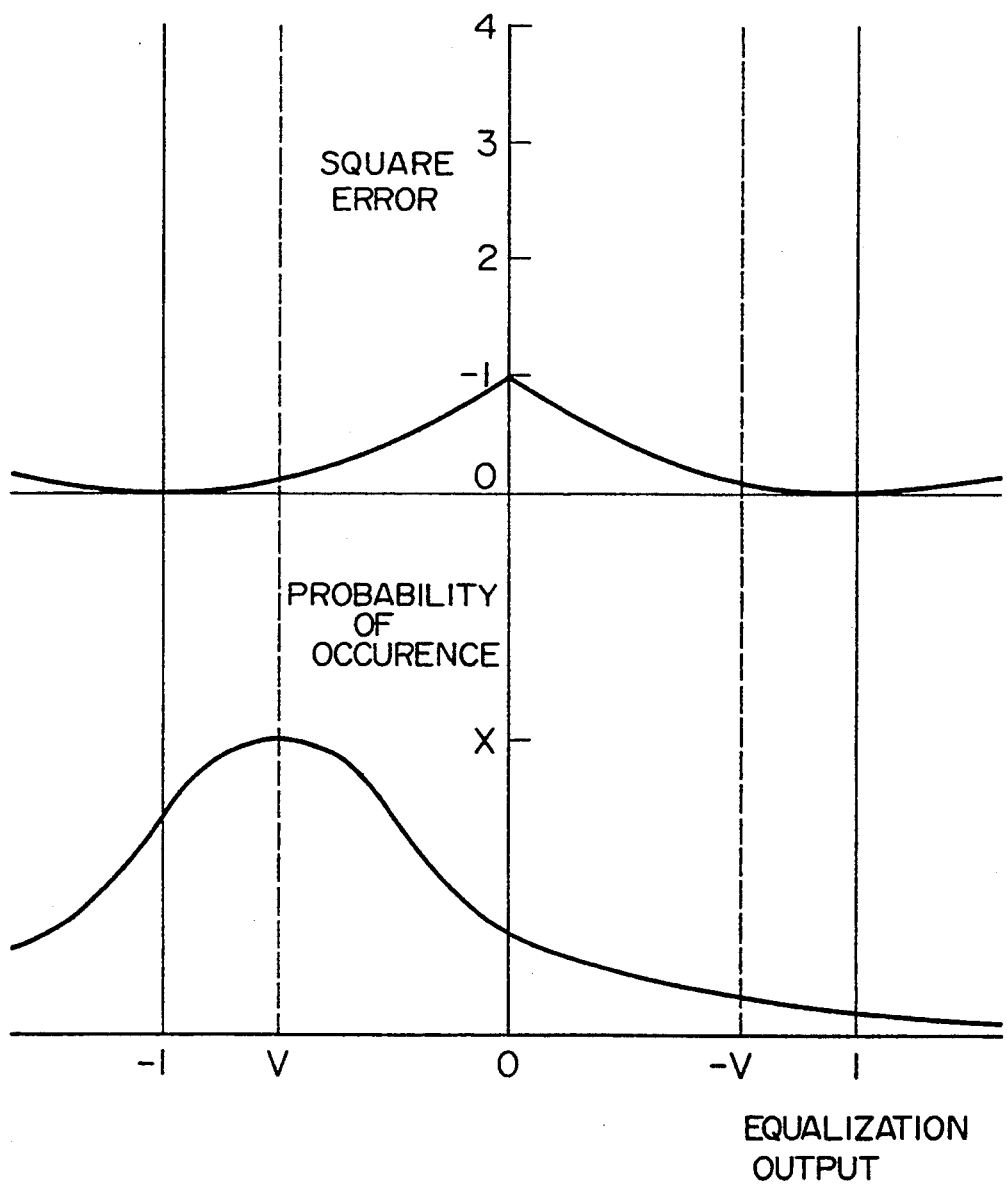
Fig. 4 shows an error characteristic chart derived from the error calculator (when a discrimination error is included)
Figure 5:
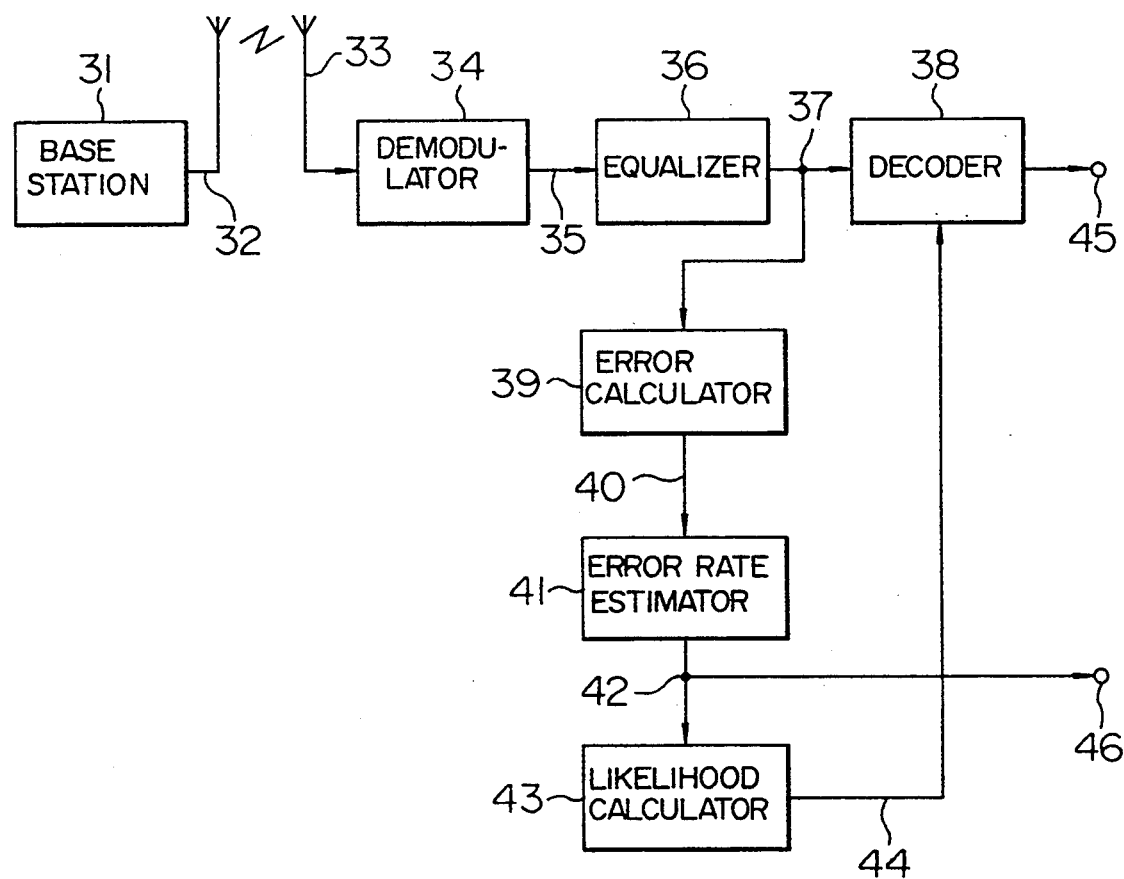
Fig. 5 shows a schematic block diagram of one embodiment of a data decoding device of the present invention.

FIG. 5 shows a configuration of one embodiment of the present invention. In FIG. 5, numeral 31 denotes a base station, numeral 32 denotes a transmission antenna thereof, numeral 33 denotes a receiving antenna of a mobile station, and numeral 34 denotes a demodulator which demodulates an RF signal produced by the antenna 33 to a base band signal. Numeral 35 denotes a demodulation signal which is an output of the 1 demodulator 34 and which is applied to an equalizer 36. A detail of the equalizer 36 is described in "ADAPTIVE EQUALIZATION IN TDMA DIGITAL MOBIL RADIO" by Uesugi et al, IEEE Global Telecommunications Conference and Exhibition 1989 Conference Record, Vol. 1 of 3, pp. 95-101, Nov. 27-, 1989, Dallas, Tex. An equalization signal 37 which is an output of the equalizer 36 is applied to a decoder 38 and an error calculator 39. The error calculator 39 is identical to that shown in FIG. 2. Numeral 40 denotes a square error which is applied to an error estimator 41. An estimated error rate 42 which is an output of the error rate estimator 41 is applied to a likelihood calculator 43 and outputted as an estimated error rate 46. A likelihood 44 which is an output of the likelihood calculator 43 is applied to the decoder 38 which produces decoded data 45 by a viterbi decoding method.

An operation of the present embodiment is now explained. The base station 31 transmits an RF signal to the mobile station from the transmission antenna 32. The mobile station receives the RF signal by the receiving antenna 33, and demodulate it by the demodulator 34 to a base band signal to be used by the equalizer 36 to produce the demodulation signal 35. The equalizer 36 eliminates a distortion of a waveform of the demodulated signal 35, improves an error rate, produces the equalization signal 37 and applies it to the error calculator 39 and the decoder 38. The error calculator 39 calculates the square error sum 40 in the same manner as that of the prior art. An S/N ratio of the equalization signal 37 and the square error sum 40 has a relation as shown by a formula (1).

$$N_\gamma = 2 - \frac{4}{\sqrt{2\pi(1+\gamma)}} e^{-\frac{\gamma}{2}} + 2\sqrt{\frac{\gamma}{1+\gamma}} \, erfc\left(\sqrt{\frac{\gamma}{2}}\right) - 1 \quad (1)$$

where

Ny: square error mean (square error sum/number of samples)

$$erfc(x) = \frac{2}{\sqrt{\pi}} \int_x^\infty e^{-t^2} dt$$

$\gamma$: S/N

It is assumed that an amplitude of the equalization signal is a normal distribution of dispersion $$\sqrt{\frac{\gamma}{1+\gamma}}$$

centered at $$\pm\sqrt{\frac{\gamma}{1+\gamma}}$$

In the error rate estimator, the estimated error rate 42 may be determined based on an inverse function of the formula (1) and a formula which represents a relation between S/N and the error rate (which is determined by a modulation/demodulation system. Formula (2) shows an example of coherent detection of MSK).

$$Pe = \frac{1}{2} \, erfc\left(\sqrt{\frac{\gamma}{2}}\right) \quad (2)$$

where

Pe: bit error rate of MSK coherent detection $$erfc(x) = \frac{2}{\sqrt{\pi}} \int_x^\infty e^{-t^2} dt$$

$\gamma$: S/N

The estimated error rate 42 is outputted as it is as the estimated error rate 46 and also applied to the likelihood calculator 43 to produce the likelihood 44. The decoder 38 makes soft decision decoding based on the likelihood 44 and the equalization signal 37 to produce the decoded data 45 having a low error rate.

In accordance with the present embodiment, since the estimated error rate 42 can be determined by the error rate estimator 41 based on the square error sum 40, it is not necessary to encode it by the decoder 38 for comparison. Further, since the estimated error rate 46 is determined without regard whether the equalization signal contains an error, the precision is enhanced. In addition, since the estimated error rate 42 is used by the likelihood calculator 43, the likelihood 44 which is closest to an optimum one is determined and the post-decoding error rate can be improved.

We claim:

1. A data decoding device comprising:
   a demodulator for demodulating a received signal;
   an equalizer for eliminating a distortion added in a transmission line from an output of said demodulator;
   an error calculator for calculating a square error sum based on an output of said equalizer;
   an error rate estimator for estimating an error rate based on the square error sum;
   a likelihood calculator for calculating a likelihood based on the error rate estimated by said error rate estimator; and
   a decoder for decoding data based on the calculated likelihood and an output of said equalizer.

2. A data decoding device according to claim 1 wherein said error calculator calculates an erroneous difference of the output of said equalizer from a preset value which is set depending on a polarity of the output of said equalizer and calculates a square error sum of the erroneous difference.

3. A data decoding device according to claim 1 wherein the data decoded by said decoder and the error rate are outputted together.

4. A data decoding device according to claim 1 wherein said decoder comprises a Viterbi decoder.

* * * * *